United States Patent [19]

Krokos

[11] 4,022,134
[45] May 10, 1977

[54] AUTOMOBILE TIE DOWN ASSEMBLY

[75] Inventor: Raymond M. Krokos, Detroit, Mich.

[73] Assignee: Evans Products Company, Chicago, Ill.

[22] Filed: Jan. 20, 1975

[21] Appl. No.: 542,616

Related U.S. Application Data

[63] Continuation-in-part of Ser. No. 457,817, April 4, 1974, abandoned.

[52] U.S. Cl. .................. 105/473; 24/230.5 TD; 105/368 T; 105/477
[51] Int. Cl.² .................. A44B 13/00; B25B 25/00; B60P 7/08; B61D 45/00
[58] Field of Search .......... 105/368 R, 368 T, 473, 105/477, 503; 248/503; 24/230.5 TD; 254/184

[56] References Cited

UNITED STATES PATENTS

| | | | |
|---|---|---|---|
| 846,316 | 3/1907 | Keyes | 254/184 X |
| 2,322,576 | 6/1943 | Huebshman et al. | 24/230.5 TD |
| 2,386,836 | 10/1945 | Blagden | 105/473 |
| 2,591,986 | 4/1952 | Weiss et al. | 24/230.5 TD |
| 2,874,992 | 2/1959 | Erickson | 248/503 |
| 3,348,273 | 10/1967 | Hall | 105/368 R |
| 3,465,691 | 9/1969 | Simmons | 105/368 T |
| 3,564,577 | 2/1971 | Blunden et al. | 105/368 T X |
| 3,601,866 | 8/1971 | Odin | 105/473 |

Primary Examiner—Robert J. Spar
Assistant Examiner—Howard Beltran
Attorney, Agent, or Firm—Harness, Dickey & Pierce

[57] ABSTRACT

A device for tying down motor vehicles during transport on a transporting vehicle, such as a railroad car, truck, or the like. The tie-down device includes a winch and a tie-down fitting for effecting a detachable connection to the transported vehicle. The tie-down fitting has a first portion that is adapted to be connected to a chain or other flexible transmitter of the winch and second and third portions, each of which is configured to effect a detachable connection to a respective attachment means of the transported vehicle. The attachment means of the respective vehicles are different, and for this reason the second and third portions of the tie-down fitting are differently configured.

1 Claim, 4 Drawing Figures

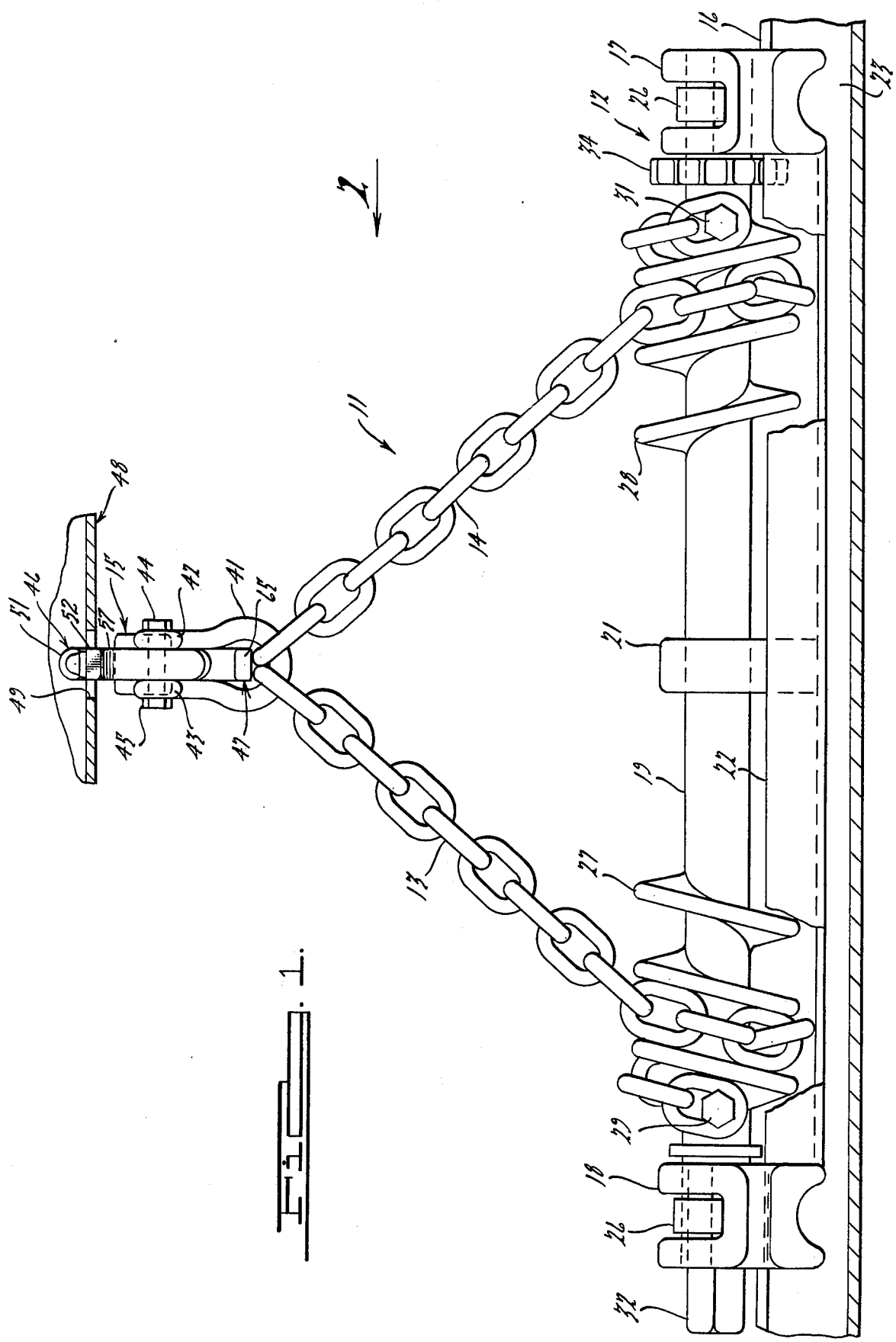

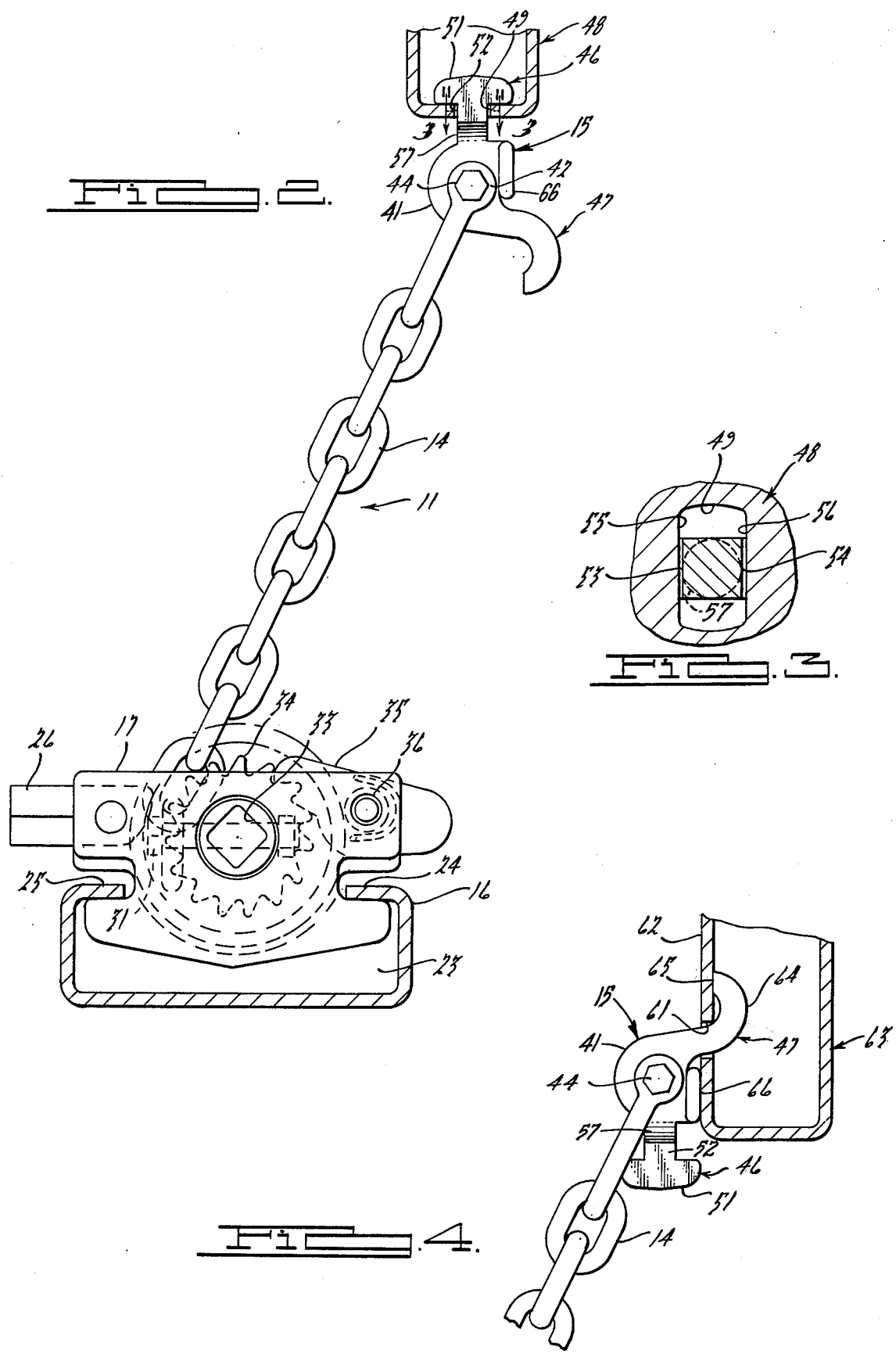

AUTOMOBILE TIE DOWN ASSEMBLY

CROSS REFERENCE TO RELATED APPLICATION

This application is a continuation-in-part of my application of the same title, filed Apr. 4, 1974, Ser. No. 457,817, now abandoned.

BACKGROUND OF THE INVENTION

This invention relates to an automotive tie-down and, more particularly, to a tie-down fitting for effecting a detachable connection to different loads.

The necessity for tying down a load during transport is well known. Tie-downs are used for holding varying types of loads, such as motor vehicles during transport. Normally, the tie-down includes a fitting for effecting a detachable connection to the load and a flexible transmitter for attaching the fitting and attached load to the transporting vehicle. In many instances, some device is also provided for tensioning the flexible transmitter to insure good tie-down of the load. It is not uncommon for a particular tie-down to be used in conjunction with the typing down or attachment of varying types of loads or for tying down loads of the same general type but having different attachment means for cooperation with the fitting. It is almost impossible to obtain the cooperation of the shippers in providing the same tie-down attachment for all loads.

It is, therefore, a principal object of this invention to provide an improved tie-down fitting that may be used with loads having different types of attachment means.

It is another object of the invention to provide a tie-down fitting for tying down motor vehicles during transport that may be attached to vehicles having different types of attachment openings in their frame or under-structure.

SUMMARY OF THE INVENTION

A tie-down fitting embodying this invention is adapted to provide a detachable connection to different loads, each having a respective type of attachment means. The tie-down fitting has a first portion that is adapted to be affixed to a chain or like flexible transmitter. Second and third portions are configured to coact with the attachment means of first and second loads, respectively. The second and third portions are configured differently from each other so as to accommodate different attachment means of the respective loads.

BRIEF DESCRIPTION OF THE DRAWINGS

FIG. 1 is a side elevational view of an automotive tie-down embodying this invention, with portions broken away.

FIG. 2 is an end elevational view of the tie-down shown in FIG. 1, taken generally in the direction of the arrow 2 and with portions broken away.

FIG. 3 is an enlarged cross sectional view taken along the line 3—3 of FIG. 2.

FIG. 4 is a partial view, in part similar to FIG. 2, showing the end fitting connected to a different type of motor vehicle attachment.

DETAILED DESCRIPTION OF THE PREFERRED EMBODIMENT

A tie-down embodying this invention is identified generally by the reference numeral 11. The tie-down 11 includes a winch, indicated generally by the reference numeral 12, which is adapted to tension a pair of flexible transmitters or chains 13 and 14 which are in turn connected to a tie-down fitting 15. The winch 12 is adapted to be connected in any of a plurality of positions to a transporting vehicle (not shown) via tracks 16. The tie-down assembly 11 is particularly adapted for use in the transportation of motor vehicles, as will become more apparent as this description proceeds.

The winch 12 is of the same construction as described in the aforenoted parent application, Ser. No. 457,817, filed Apr. 4, 1974, and assigned to the assignee of this invention. The winch 12 is comprised of a pair of spaced bearing members, preferably forgings, 17 and 18 that journal a shaft 19. An intermediate shaft support 21 may also be employed. The forgings 17 and 18 and intermediate shaft support 21 are all affixed to a common channel-shaped member 22. The forgings 17 and 18 have a generally inverted T-shaped configuration in cross section (FIG. 2) and are adapted to be inserted into a longitudinally extending opening 23 of the track 16. A pair of inwardly extending legs 24 and 25 of the track 16 engage the T-shaped portions of the forgings 17 and 18 to hold the winch 12 vertically relative to the associated transporting vehicle. A suitable locking mechanism including a pivoted lever 26 is provided for locking the winch 12 in selected longitudinal positions relative to the transporting vehicle through cooperation with a locking track (not shown).

The shaft 19 is formed with a pair of screw-like portions 27 and 28 which are of opposite hand. At the outer ends of the screw portions 27 and 28 connections 29 and 31 are provided for affixing one end of each of the chains 13 and 14 to the shaft 19.

The shaft 19 may be rotated by inserting either a female-headed tool on a squared portion 32 at one end of the shaft 19 or a male-headed tool into a square-shaped opening 33 formed in the opposite end of the shaft 19. A ratchet wheel 34 is affixed to the shaft 19 for cooperation with a locking pawl 35 which is spring biased into an engaged position to prevent the shaft 19 from rotating in a direction so as to relieve the tension on the chains 13 and 14. The locking pawl 35 is pivotally supported on the forging 17 by means of a pivot pin 36 and is movable between a locked position (as shown in FIG. 2) and a released position in which the shaft 19 is free to rotate in either direction. Reference may be had to my aforenoted copending parent application for further details of the winch 12.

The ends of the chains 13 and 14 remote from the winch 12 are connected to the tie-down fitting 15 by a U-shaped clevis 41. The clevis 41 has eyelets 42 and 43 that receive a bolt 44 and nut 45 for affording a detachable connection between the clevis 41 and the fitting 15.

The fitting 15 may be formed as a forging, casting, or the like and is configured to effect a detachable connection to motor vehicles having different types of detachment openings. The fitting 15 has first and second respective portions 46 and 47 for this purpose.

The portion 46 is adapted to be used in conjunction with a motor vehicle having a generally slotted opening in a lower or horizontally extending portion of its undercarriage. Such an attachment is shown in FIGS. 1–3 wherein the motor vehicle undercarriage is identified generally by the reference numeral 48. The undercarriage 48 is formed with an elongated opening 49 in its lowermost surface. The fitting portion 46 has a generally T-shaped configuration with a head portion 51 that is adapted to be passed through the opening 49 when the fitting 15 is rotated 90° from the position shown in the FIGS. At the base of the head portion 51, a square-sided shank portion 52 is provided. The portion 52 has flat sides 53 and 54 (FIG. 3) that extend parallel to complementary sides 55 and 56 of the opening 49. The cooperation between the respective flats 53, 55 and 54, 56 prevent the fitting 15 from rotating when the chains 13 and 14 are tensioned and thus preclude inadvertent detachment of the fitting 15 from the vehicle undercarriage 48. Below the square-sided portion 52, a rounded-sided portion 57 is formed that permits free rotation of the fitting 15 relative to the frame portion 48 so as to permit attachment and desired disconnection.

The fitting portion 47 is used for affording a detachable connection to a vehicle having an undercarriage as shown in FIG. 4. With this type of opening, a generally circular-shaped aperture 61 is formed in a vertically extending leg 62 of the vehicle under carriage 63. The fitting portion 47 is comprised of a hook-like section 64 that is adapted to be passed into the opening 61 with its flattened end 65 in engagement with the inner surface of the under-frame portion 62. A pad 66 formed adjacent the pivot point afforded by the bolt 44 engages the outer surface of the undercarriage portion 62. It should be noted from an inspection of FIG. 4 that the tension on the chains 13 and 14 will apply a force on the fitting portion 47 that causes the pad 66 and flattened end portion 65 to engage opposite sides of the frame portion 62 thus preventing inadvertent detachment.

From the foregoing description, it should be readily apparent that the fitting 15 affords a detachable connection to either of two different types of automotive attachment openings. Each attachment is designed so as to prevent inadvertent detachment when the fitting is under load but which will readily be detachable when the fitting is not tensioned.

It is to be understood that the foregoing description is that of a preferred embodiment. Various changes and modifications may be made without departing from the spirit and scope of the invention, as defined by the appended claims.

I claim

1. A tie-down fiting for providing a detachable connection to a first load having an elongated opening defined by parallel sides and a second load having a generally circular opening, said tie-down fitting having first and second attachment parts angularly disposed relative to each other and connected to a base part, said base part having an opening formed therein for affording a pivotal connection to a flexible transmitter, said first attachment part comprising an elongated portion adapted to extend into the elongated hole and having a length greater than the distance between the parallel sides for engagement therewith to afford a detachable connection to the first load, a generally flat-sided portion formed directly adjacent said elongated portion for engaging the parallel sides for precluding rotation of said fitting relative to said first load when said fitting is tensioned, and a generally curved portion positioned between said flat sided portion and said base part, said curved portion being configured to permit said tie-down fitting to be rotated for entry of said elongated portion into the elongated opening between the parallel sides and subsequent return of said elongated portion to an overlying relation with the parallel sides, said second part comprising a hook portion adapted to extended into the generally circular hole and having a flattened end adapted to engage the inner surface of the member in which said circular hole is formed and a pad portion spaced from said hook portion and adapted to engage the outer surface of the member in which said circular hole is formed.

* * * * *